(12) United States Patent
Kramer et al.

(10) Patent No.: US 10,807,273 B2
(45) Date of Patent: Oct. 20, 2020

(54) HIGH TEMPERATURE ADDITIVE MANUFACTURING PRINT HEAD

(71) Applicant: LAWRENCE LIVERMORE NATIONAL SECURITY, LLC, Livermore, CA (US)

(72) Inventors: Kevin J. Kramer, Pleasanton, CA (US); Andrew Bayramian, Manteca, CA (US); James A. DeMuth, Livermore, CA (US); Bassem S. El-dasher, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 602 days.

(21) Appl. No.: 14/948,921

(22) Filed: Nov. 23, 2015

(65) Prior Publication Data
US 2017/0144328 A1 May 25, 2017

(51) Int. Cl.
| | |
|---|---|
| *B28B 1/00* | (2006.01) |
| *B33Y 30/00* | (2015.01) |
| *B22D 11/10* | (2006.01) |
| *B22D 11/01* | (2006.01) |
| *B33Y 10/00* | (2015.01) |
| *B22F 3/105* | (2006.01) |

(52) U.S. Cl.
CPC .......... *B28B 1/001* (2013.01); *B22D 11/01* (2013.01); *B22D 11/10* (2013.01); *B22F 3/1055* (2013.01); *B33Y 10/00* (2014.12); *B33Y 30/00* (2014.12)

(58) Field of Classification Search
CPC ....... B22D 11/01; B22D 11/10; B22F 3/1055; B28B 1/001; B33Y 10/00; B33Y 30/00

USPC ............. 222/591; 264/129, 176.1, 40.6, 401, 264/328.1, 255, 171.1; 425/113, 461, 425/143, 190, 191

See application file for complete search history.

(56) References Cited

U.S. PATENT DOCUMENTS

| | | | | |
|---|---|---|---|---|
| 5,340,433 | A * | 8/1994 | Crump | B22F 3/115 156/578 |
| 6,722,872 | B1 * | 4/2004 | Swanson | B29C 41/36 425/225 |
| 7,261,230 | B2 * | 8/2007 | Harun | B23K 20/005 156/73.2 |
| 7,819,055 | B2 * | 10/2010 | Tezuka | B41J 3/4073 101/35 |
| 8,460,755 | B2 | 6/2013 | Rodgers | |
| 8,647,098 | B2 * | 2/2014 | Swanson | B33Y 30/00 425/113 |
| 9,738,030 | B2 * | 8/2017 | Lee | B29C 59/026 |
| 10,029,415 | B2 * | 7/2018 | Swanson | B29C 64/171 |

(Continued)

FOREIGN PATENT DOCUMENTS

WO      2014068579      5/2014

*Primary Examiner* — Keith D. Hendricks
*Assistant Examiner* — Michael Aboagye
(74) *Attorney, Agent, or Firm* — Eddie E. Scott; Michael James Mancuso

(57) ABSTRACT

A system of 3D printing using a high temperature 3D print head that functions as a "modified ink jet" printer. The print head has the ability to print high temperature material such as metal, silicon carbide, and other high temperature material as opposed to inks or plastics. The print head is fabricated from a high temperature material to maintain structural integrity while operation at temperatures above the melting temperature for the material that is being printed.

5 Claims, 6 Drawing Sheets

(56) References Cited

U.S. PATENT DOCUMENTS

| | | | |
|---|---|---|---|
| 2009/0137439 A1* | 5/2009 | Dinh | B41J 2/16552 510/170 |
| 2015/0201500 A1* | 7/2015 | Shinar | H05K 3/125 425/132 |
| 2015/0298394 A1* | 10/2015 | Sheinman | B29C 67/0059 427/402 |

* cited by examiner

HIGH TEMPERATURE ADDITIVE MANUFACTURING PRINT HEAD

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to additive manufacturing and more particularly to a high temperature additive manufacturing print head.

State of Technology

This section provides background information related to the present disclosure which is not necessarily prior art.

International Patent No. WO/2014068579 for system and method for direct inkjet printing of 3d objects provides the state of technology information reproduce below.

A number of different processes for fabricating solid objects by 3D printing are known. Typically, the processes successively print layers of material in different shapes based on a 3D model of the object. The different processes typically differ in the way layers are deposited and in the materials that can be used.

U.S. Pat. No. 6,722,972 for a high temperature modeling apparatus provides the state of technology information reproduce below.

Examples of apparatus and methods for making three-dimensional models by depositing layers of flowable modeling material are described in Valavara U.S. Pat. No. 4,749,347; Crump U.S. Pat. No. 5,121,329, Batchelder, et al. U.S. Pat. No. 5,303,141, Crump U.S. Pat. No. 5,340,433, Batchelder, et al. U.S. Pat. No. 5,402,351, Crump et al. U.S. Pat. No. 5,503,785, Abrams et al. U.S. Pat. No. 5,587,913, Danforth, et al. U.S. Pat. No. 5,738,817, Batchelder, et al. U.S. Pat. No. 5,764,521 and Comb et al. U.S. Pat. No. 5,939,008, all of which are assigned to Stratasys, Inc., the assignee of the present invention. An extrusion head extrudes heated, flowable modeling material from a nozzle onto a base. The base comprises a modeling substrate which is removably affixed to a modeling platform. The extruded material is deposited layer-by-layer in areas defined from the CAD model, as the extrusion head and the base are moved relative to each other in three dimensions by an x-y-z gantry system. The material solidifies after it is deposited to form a three-dimensional model. It is disclosed that a thermoplastic material may be used as the modeling material, and the material may be solidified after deposition by cooling.

Technology described in the aforementioned patents is commercialized in Stratasys FDM® modeling machines. The extrusion head, which includes a liquefier and a dispensing nozzle, receives modeling material in a solid form. The filament is heated to a flowable temperature inside the liquefier and it is then dispensed through the nozzle. Thermoplastic materials, particularly ABS thermoplastic, have been found particularly suitable for deposition modeling in the Stratasys FDM® modeling machines. A controller controls movement of the extrusion head in a horizontal x, y plane, controls movement of the build platform in a vertical z-direction, and controls the feeding of modeling material into the head. By controlling these processing variables, the modeling material is deposited at a desired flow rate in "beads" or "roads" layer-by-layer in areas defined from the CAD model to create a three-dimensional object that resembles the CAD model. The modeling material thermally solidifies, and the finished model is removed from the substrate.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventors have developed a high temperature 3D print head apparatus, systems, and methods for 3D printing. The inventors' print head is made of a high temperature resistant material and functions as a "modified ink jet" printer. The high temperature print head maintains structural integrity while operation at temperatures above the melting temperature for the material that is being printed.

The inventors' print head has the ability to print high temperature materials such as metals, silicon carbide, and other high temperature materials as opposed to inks or plastics. The print head sweeps a predefined and computer controlled area to layer material at tens of microns layer thicknesses. The printing operation can be used to apply a thin "2D" layer on top of a substrate material or to continuously build up a 3D part. An important benefit of the inventor's 3D print head apparatus, systems, and methods is that it eliminates the powders and raster scanning requirements in prior art additive manufacturing.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1:
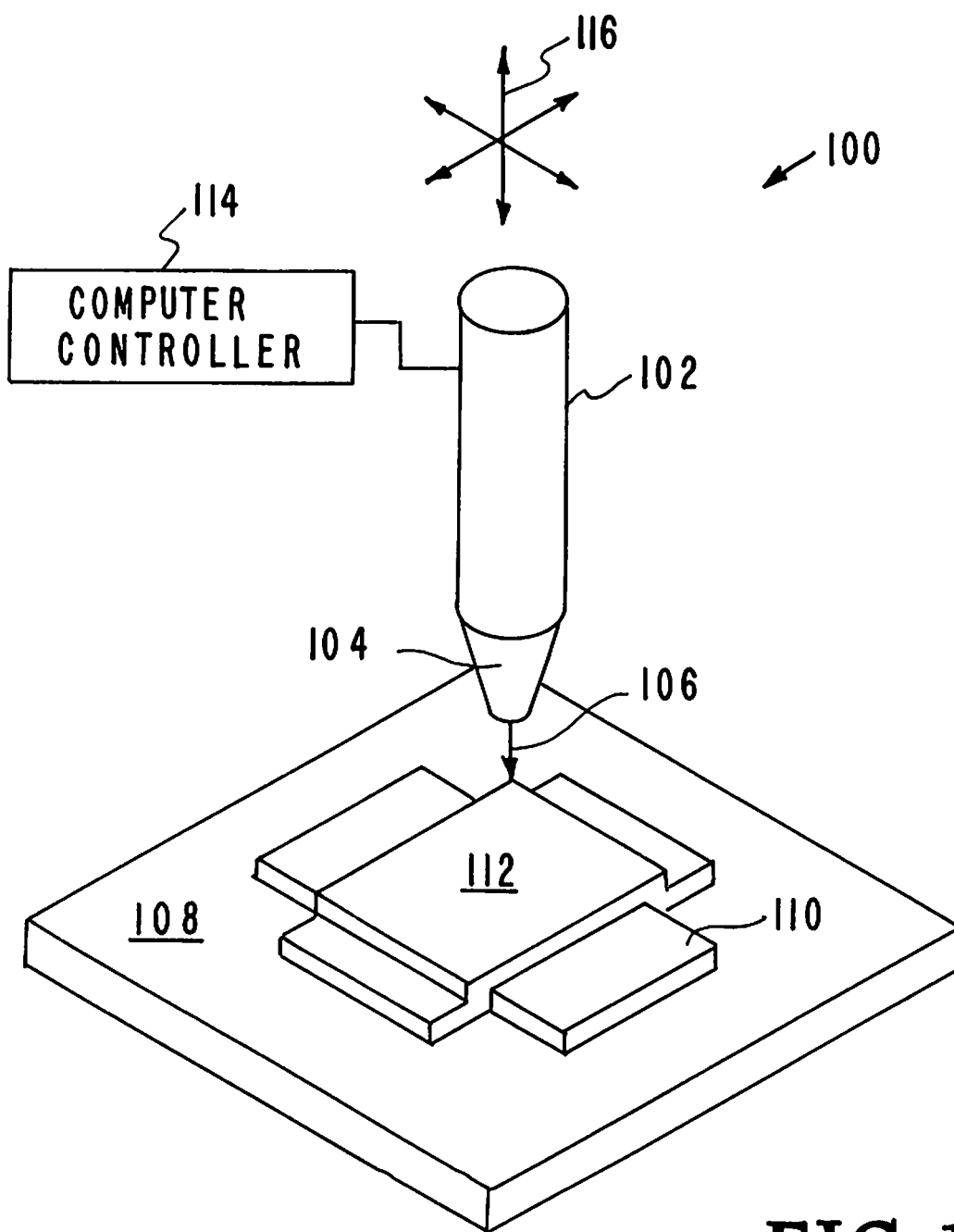
FIG. 1 is a view of the inventor's apparatus, systems, and methods illustrating its operation.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

The inventors have developed a system of 3D printing using a high temperature 3D print head that functions as a "modified ink jet" printer. The inventors' print head has the ability to print high temperature materials such as metals, silicon carbide, and other high temperature materials as opposed to inks or plastics. The print head is fabricated from a high temperature material to maintain structural integrity while operation at temperatures above the melting temperature for the material that is being printed.

Referring now to the drawings and in particular to FIG. 1, an embodiment of the inventor's apparatus, systems, and methods is illustrated. FIG. 1 is a view illustrating the operation of the apparatus, systems, and methods. This embodiment of the inventor's apparatus, systems, and methods is designated generally by the reference numeral 100.

The system 100 is shown extruding a strand 106 of high temperature material such as metal, silicon carbide, or other high temperature material from a nozzle 104 of a print head 102 to form a second layer 112 of the product being produced. The second layer 112 is being formed on a first layer 110. The first layer 110 was previously extruded onto a substrate 108.

The system 100 operates to produce the product by sequentially layering one material on top of another in a desired pattern. Movement of the print head 102 is controlled by a computer controller 114 which provides freedom of movement along all axes as indicated by the arrows 116. Instruction information regarding the product to be created by the system 100 is fed to the computer controller 114 with a system such as the widely used numerical control programming language. The computer controller 114 uses the instructions to move the print head 102 through a series of moments along the substrate 108 forming the product. The print head 102 has a nozzle 104 for extruding a bead 106 the high temperature material such as metal, silicon carbide, or other high temperature material.

The system 100 operates to build 3D structures by sequentially layering one material on top of another in a desired pattern. The first layer 110 of material was originally extruded onto a substrate 108. The second layer 112 of material was extruded onto the first layer 110 of material. This process is continued until the final product is produced.

Figure 2:
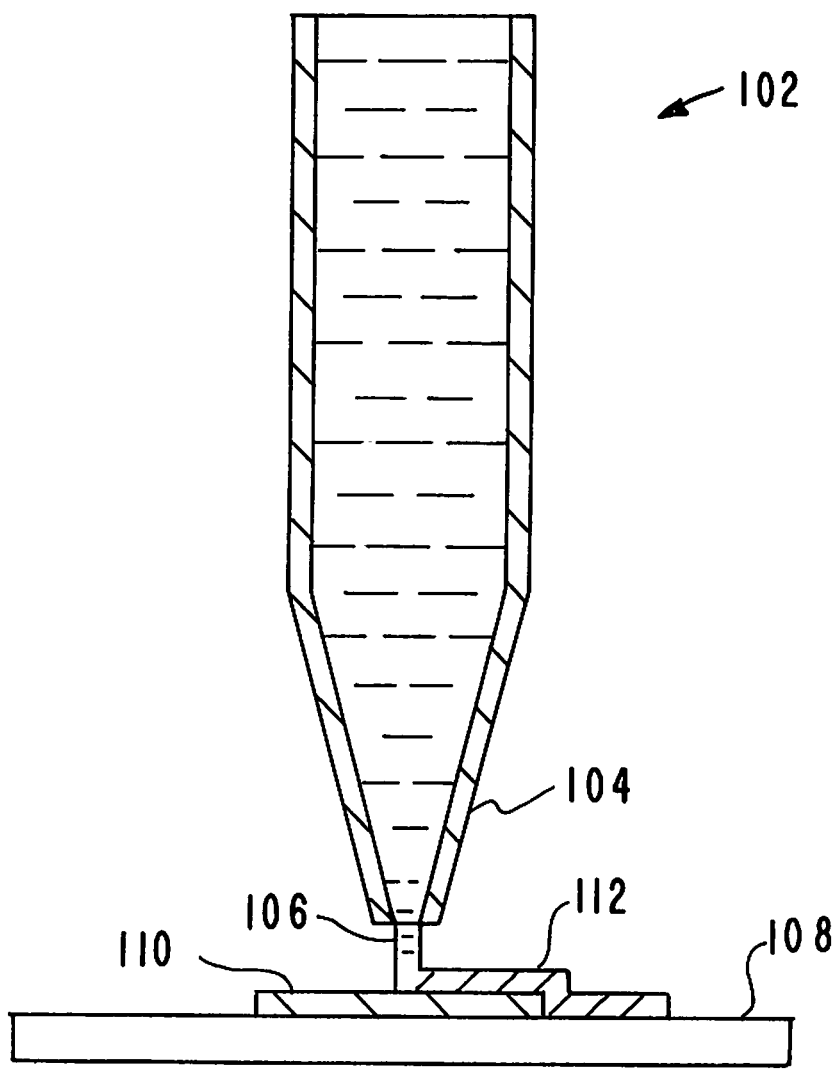
FIG. 2 shows the print head of FIG. 1 in greater detail.

Referring now to FIG. 2, the print head 102 of FIG. 1 is shown in greater detail. The print head 102 has a cylindrical body and a nozzle 104 made of a high temperature tolerant material. The print head 102 extrudes a strand 106 of high temperature material such as metal, silicon carbide, or other high temperature material to form the second layer 112 of the product being produced. The second layer 112 is being formed on the first layer 110. The first layer 110 was originally extruded onto the substrate 108.

Example 1—Tungsten Print Head

Figure 3:
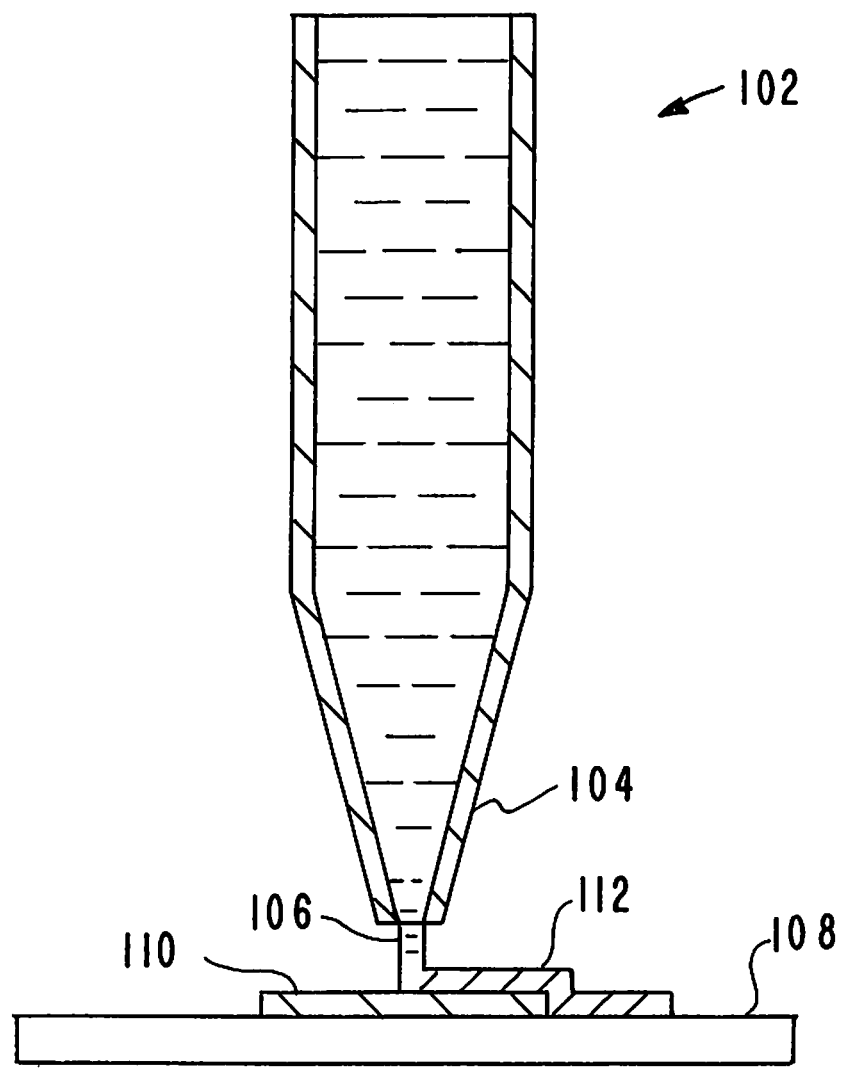
FIG. 3 illustrates another embodiment of inventor's apparatus, systems, and methods.

Referring now to FIG. 3, an illustration of a first example of the inventor's apparatus, systems, and methods is provided. The print head 102 is made of tungsten. The print head 102 has a cylindrical body made of tungsten. The nozzle 104 is also made of tungsten. The print head 102 is shown extruding a strand 106 of high temperature material such as metal, silicon carbide, or other high temperature material from the nozzle 104 to form a second layer 112 of the product being produced. The second layer 112 is being formed on a first layer 110. The first layer 110 was originally extruded onto a substrate 108.

Example 2—Ceramic Composite Print Head

Figure 4:
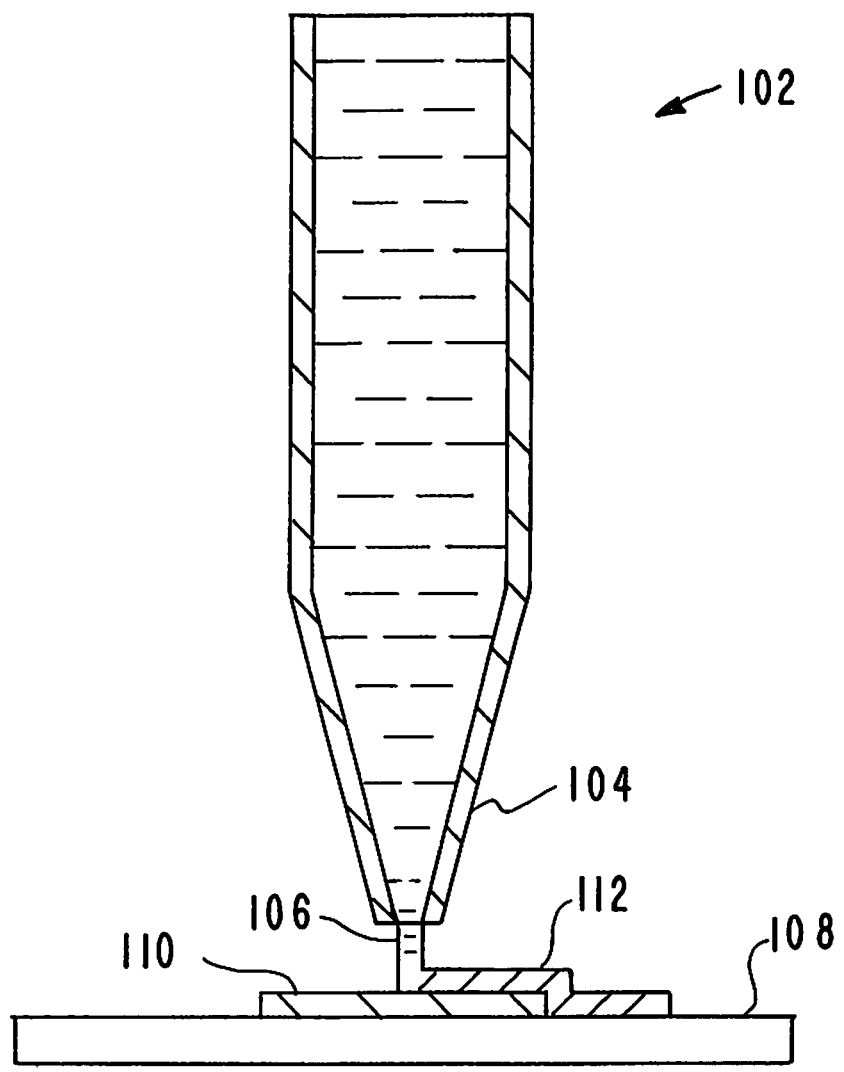
FIG. 4 illustrates yet another embodiment of inventor's apparatus, systems, and methods.

Referring now to FIG. 4, an illustration of a second example of the inventor's apparatus, systems, and methods is provided. The print head 102 is made of ceramic composite. The print head 102 has a cylindrical body made of ceramic composite. The nozzle 104 is also made of ceramic composite. The print head 102 is shown extruding a strand 106 of high temperature material such as metal, silicon carbide, or other high temperature material from the nozzle 104 to form a second layer 112 of the product being produced. The second layer 112 is being formed on a first layer 110. The first layer 110 was originally extruded onto a substrate 108.

Example 3—Print Head with Sleeve

Figure 5:
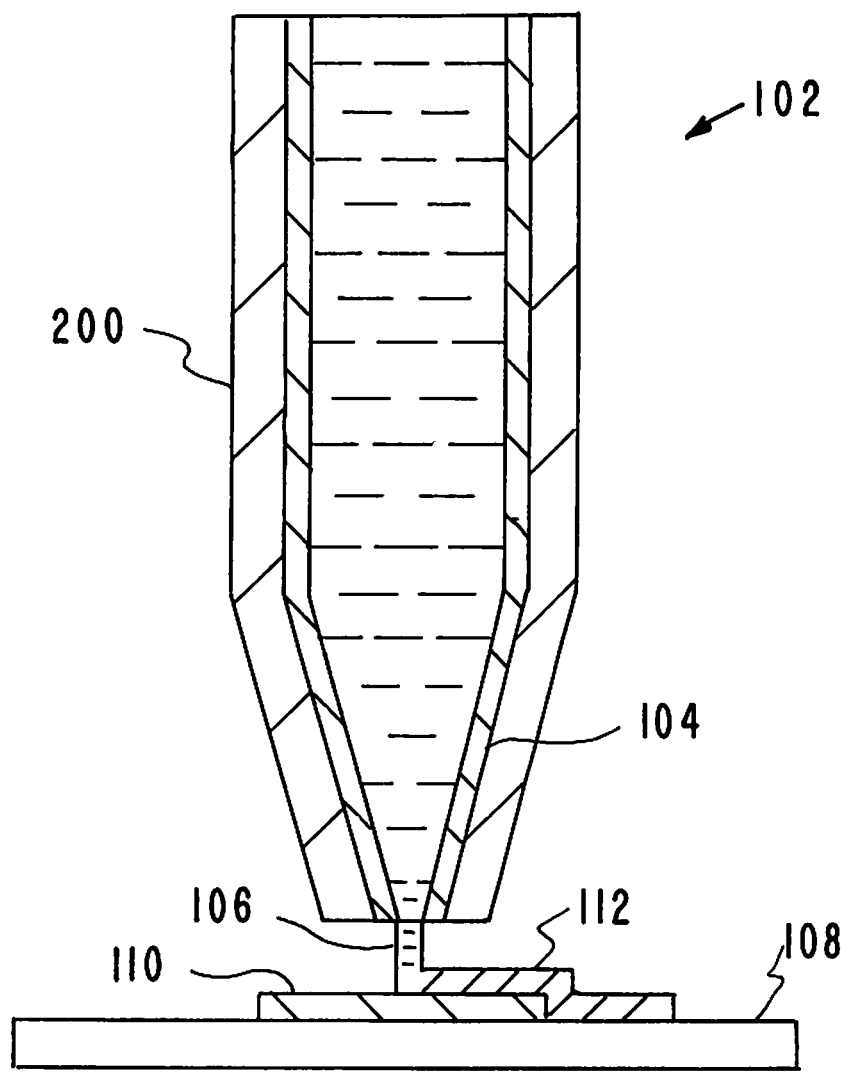
FIG. 5 illustrates another embodiment of inventor's apparatus, systems, and methods.

Referring now to FIG. 5, an illustration of a third example of the inventor's apparatus, systems, and methods is provided. The print head 102 is made of tungsten. The print head 102 has a cylindrical body made of tungsten. The nozzle 104 is also made of tungsten. A sleeve 200 is positioned around the print head 102. The sleeve can be made of tungsten, ceramic composite, or other material the will withstand high temperature. The print head 102 is shown extruding a strand 106 of high temperature material such as metal, silicon carbide, or other high temperature material from the nozzle 104 to form a second layer 112 of the product being produced. The second layer 112 is being formed on a first layer 110. The first layer 110 was originally extruded onto a substrate 108.

Example 4—Print Head with Heater

Figure 6:
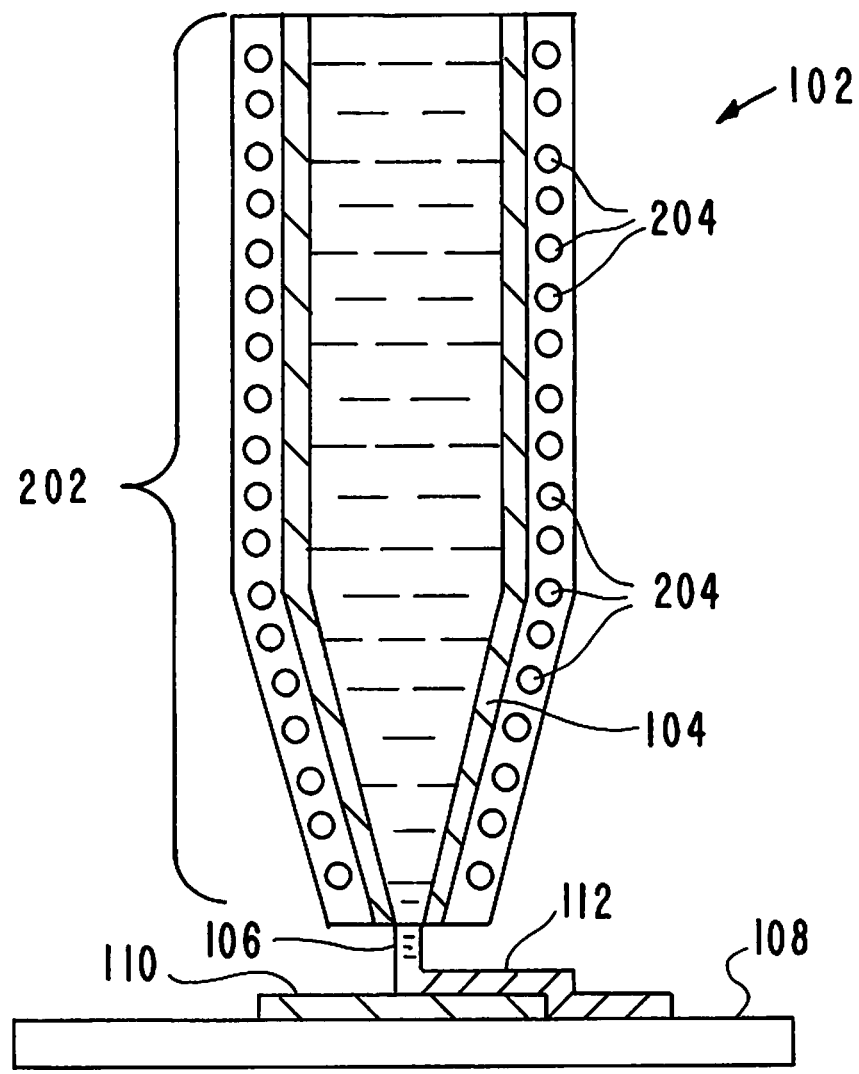
FIG. 6 illustrates another embodiment of inventor's apparatus, systems, and methods.

Referring now to FIG. 6, an illustration of a fourth example of the inventor's apparatus, systems, and methods is provided. The print head 102 is made of tungsten. The print head 102 has a cylindrical body made of tungsten. The nozzle 104 is also made of tungsten. A heater 202 is positioned around the print head 102. The heater 202 includes heating coils 204. The print head 102 is shown extruding a strand 106 of high temperature material such as metal, silicon carbide, or other high temperature materials from the nozzle 104 to form a second layer 112 of the product being produced. The second layer 112 is being formed on a first layer 110. The first layer 110 was originally extruded onto a substrate 108.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An additive manufacturing apparatus for producing a product from a material, comprising: an additive manufacturing print head having a sleeve that provides a cylindrical body, and wherein said sleeve that provides said cylindrical body is made of tungsten; a nozzle in said sleeve that provides said cylindrical body, wherein said nozzle is a tapered nozzle extending from said cylindrical body, and wherein said tapered nozzle is made of tungsten, said tapered nozzle configured for extruding said material; a heater in said sleeve that provides said cylindrical body, wherein said heater is positioned around said tapered nozzle and extends to a tip of said tapered nozzle; heating coils in said heater, wherein said heating coils are positioned in said sleeve that provides said cylindrical body, wherein said heating coils are positioned around said tapered nozzle and extend to said tip of said tapered nozzle; and a system for moving said additive manufacturing print head, said sleeve that provides said cylindrical body, said tapered nozzle, said heater, and said heating coils to form the product.

2. The additive manufacturing system for producing a product of claim 1 wherein said system for moving said additive manufacturing print head and said tapered nozzle to form the product is a computer controller containing instructions for producing the product.

3. The additive manufacturing system for producing a product of claim 1 wherein said material is metal.

4. The additive manufacturing system for producing a product of claim 1 wherein said material is liquid metal.

5. The additive manufacturing system for producing a product of claim 1 wherein said material is silicon carbide.

* * * * *